United States Patent
Graciarena et al.

(10) Patent No.: US 7,571,095 B2
(45) Date of Patent: *Aug. 4, 2009

(54) METHOD AND APPARATUS FOR RECOGNIZING SPEECH IN A NOISY ENVIRONMENT

(75) Inventors: Martin Graciarena, Menlo Park, CA (US); Horacio Franco, Menlo Park, CA (US); Venkata Ramana Rao Gadde, Santa Clara, CA (US)

(73) Assignee: SRI International, Menlo Park, CA (US)

( * ) Notice: Subject to any disclaimer, the term of this patent is extended or adjusted under 35 U.S.C. 154(b) by 737 days.

This patent is subject to a terminal disclaimer.

(21) Appl. No.: 11/216,669

(22) Filed: Aug. 31, 2005

(65) Prior Publication Data

US 2006/0195317 A1 Aug. 31, 2006

Related U.S. Application Data

(63) Continuation-in-part of application No. 09/930,389, filed on Aug. 15, 2001, now Pat. No. 7,120,580.

(51) Int. Cl.
G10L 15/20 (2006.01)
(52) U.S. Cl. ...................................... 704/233
(58) Field of Classification Search ................. 704/233
See application file for complete search history.

(56) References Cited

U.S. PATENT DOCUMENTS

| | | | | |
|---|---|---|---|---|
| 5,220,610 | A * | 6/1993 | Kane et al. ................... | 704/233 |
| 5,355,431 | A * | 10/1994 | Kane et al. ................... | 704/226 |
| 5,621,850 | A * | 4/1997 | Kane et al. ................... | 704/206 |
| 6,687,672 | B2 * | 2/2004 | Souilmi et al. ............... | 704/237 |
| 7,120,580 | B2 * | 10/2006 | Rao Gadde et al. ......... | 704/233 |

* cited by examiner

Primary Examiner—Susan McFadden

(57) ABSTRACT

An apparatus and a concomitant method for recognizing speech in a noisy environment are provided. The present method includes applying a first interpolation weight to a clean speech model to produce a weighted clean speech model, applying a second interpolation weight to a noise model to produce a weighted noise model, and deriving a noisy speech model directly from the weighted clean speech model and the weighted noise model. At least one of the first interpolation weight and the second interpolation weight is computed in a maximum likelihood framework.

20 Claims, 5 Drawing Sheets

METHOD AND APPARATUS FOR RECOGNIZING SPEECH IN A NOISY ENVIRONMENT

CROSS REFERENCE TO RELATED APPLICATIONS

This application is a continuation-in-part of U.S. patent application Ser. No. 09/930,389, filed Aug. 15, 2001, now U.S. Pat. No. 7,120,580 which is herein incorporated by reference in its entirety.

REFERENCE TO GOVERNMENT FUNDING

The present invention was made with Government support under contract Number MDA972-02-C-0038 awarded by the Defense Advanced Research Projects Agency. The Government has certain rights in this invention.

FIELD OF THE INVENTION

The present invention relates to an apparatus and concomitant method for audio signal processing. More specifically, the present invention provides a new noise compensation method for adapting speech models to noise in a recognition system, thereby improving the speed of speech recognition and reducing the computational cycles required.

BACKGROUND OF THE DISCLOSURE

Speech recognition systems are designed to undertake the difficult task of extracting recognized speech from an audio signal (e.g., a natural language signal). The speech recognizer within such speech recognition systems must account for diverse acoustic characteristics of speech such as vocal tract size, age, gender, dialect, and the like. Artificial recognition systems are typically implemented using powerful processors with large memory capacity to handle the various complex algorithms that must be executed to extract the recognized speech.

To further complicate the complex speech recognition process, the audio signal is often obtained or extracted from a noisy environment (e.g., an audio signal captured in a moving vehicle or in a crowded restaurant), thereby compromising the quality of the input audio signal. To address the noisy background or environmental contamination, the speech recognizer can be implemented with various noise compensation algorithms.

Noise compensation schemes include the Parallel Model Combination (PMC) and other model adaptation techniques. However, these schemes often require large amounts of memory and are computationally intensive. To illustrate, the PMC method is a method of adding and synthesizing a Hidden Markov Model (HMM) (speech HMM) learned by speech collected and recorded in a noiseless environment and an HMM (noise HMM) learned by noise. In the noise process of the PMC, it is presumed that addictiveness of noise and speech is established in a linear spectrum region. In contrast, in the HMM, parameters of a logarithm spectrum system, such as a cepstrum and the like, are often used as a characteristic amount of the speech. According to the PMC method, those parameters are converted into the linear spectrum region and then are added and synthesized in the linear spectrum region of the characteristic amount, which is derived from the speech HMM and noise HMM. After the speech and the noise are synthesized, an inverse operation is performed to return the synthesized value from the linear spectrum region to the cepstrum region, thereby obtaining a noise superimposed speech HMM. However, although the PMC is effective in addressing additive noise, the PMC method is very computationally expensive because the nonlinear conversion is applied to all of the models. Namely, the amount of calculations is very large, the processing time is very long, and it may not be suitable for a real time application or a portable application where processing resources and memory capacity are limited.

Therefore, a need exists for a fast and computationally inexpensive method that addresses the problem of speech recognition in noisy environments without the need of any prior recognition pass or large memory capacity.

SUMMARY OF THE INVENTION

An apparatus and a concomitant method for recognizing speech in a noisy environment are provided. The present method includes applying a first interpolation weight to a clean speech model to produce a weighted clean speech model, applying a second interpolation weight to a noise model to produce a weighted noise model, and deriving a noisy speech model directly from the weighted clean speech model and the weighted noise model. At least one of the first interpolation weight and the second interpolation weight is computed in a maximum likelihood framework.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
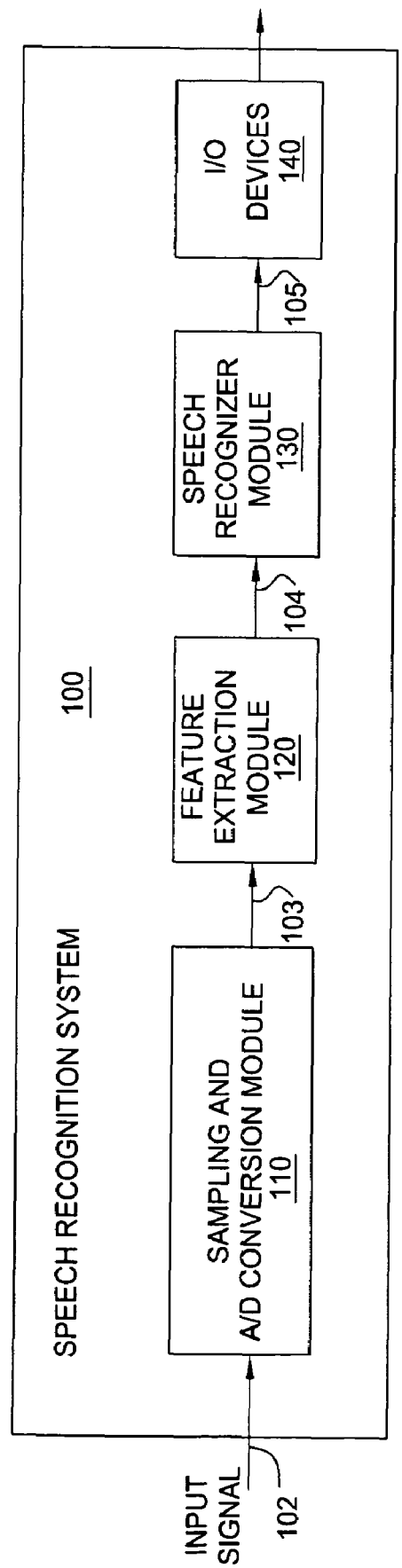
FIG. 1 illustrates a block diagram of a speech recognition system of the present invention.
Figure 5:
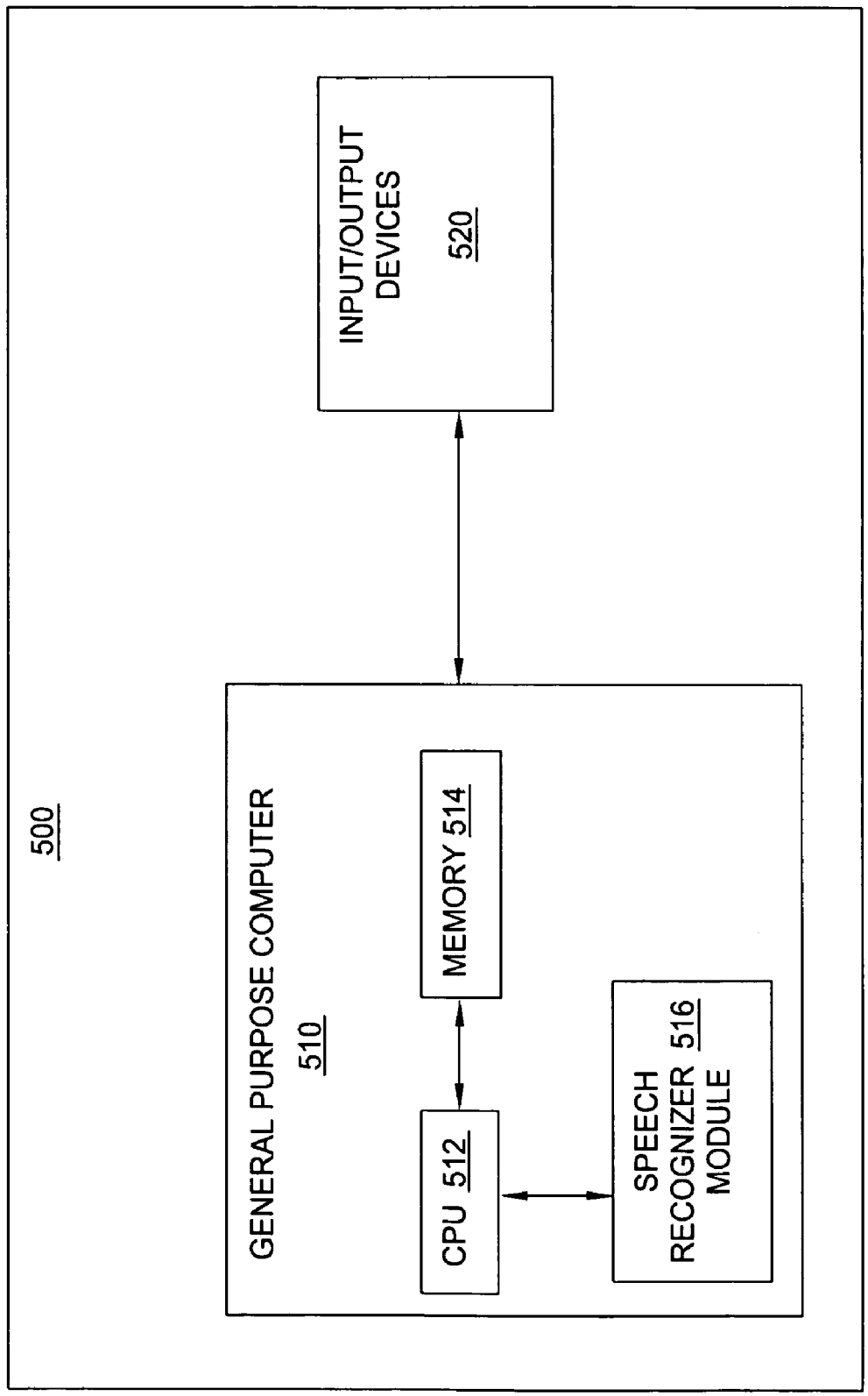
FIG. 5 illustrates a block diagram of a speech recognition system of the present invention as implemented using a general purpose computer.

FIG. 1 illustrates a block diagram of a speech recognition device or system 100 of the present invention. In one embodiment, the speech recognition device or system 100 is implemented using a general purpose computer or any other hardware equivalents as shown in FIG. 5 below. Although the recognition device or system 100 is preferably implemented as a portable device, it should be noted that the present invention can also be implemented using a larger computer system, e.g., a desktop computer or server and the like.

The speech recognition device or system 100 comprises a sampling and Analog-to-Digital (A/D) conversion module 110, a feature extractor or feature extraction module 120, a speech recognizer or a speech recognizer module 130 and various Input/Output (I/O) devices 140. In operation, an input audio signal (e.g., a speech signal) on path 102 is received by the sampling and Analog-to-Digital (A/D) conversion module 110, where the input signal is sampled and digitized from a microphone (not shown) into a sequence of samples that are later processed by a processor.

The digitized sequence of samples is then forwarded on path 103 to the feature extraction module 120. The sample sequence is first grouped into frames (commonly 1 centisecond in length) and speech features are extracted for each of the frames using various signal processing methods. Some examples of these are Mel-cepstral features, or PLP cepstral features.

Specifically, conventional feature extraction methods for automatic speech recognition generally rely on power spectrum approaches, whereby the acoustic signals are generally regarded as a one dimensional signal with the assumption that the frequency content of the signal captures the relevant feature information. This is the case for the spectrum representation, with its Mel or Bark variations, the cepstrum, FFT-derived (Fast Fourier Transform) or LPC-derived (Linear Predictive Coding), LPC derived features, the autocorrelation, the energy content, and all the associated delta and delta-delta coefficients.

Cepstral parameters are effectively used for efficient speech and speaker recognition. Originally introduced to separate the pitch contribution from the rest of the vocal cord and vocal tract spectrum, the cepstrum has the additional advantage of approximating the Karhunen-Loeve transform of speech signal. This property is highly desirable for recognition and classification. In one embodiment of the present invention, the speech features on path 104 can be Mel-cepstral features, or PLP cepstral features.

It should be noted that the present invention is not limited to a particular type of feature, as long as the same features are used to train the models and used during the recognition process. Namely, the present invention is not feature dependent.

In turn, the speech recognizer 130 receives the speech features and is able to decode the "recognized text" from the speech features using various models as discussed below. Finally, the recognized text on path 105 is further processed by various I/O devices or other processing modules 140, e.g., natural language processing module, speech synthesizer and the like.

Figure 2:
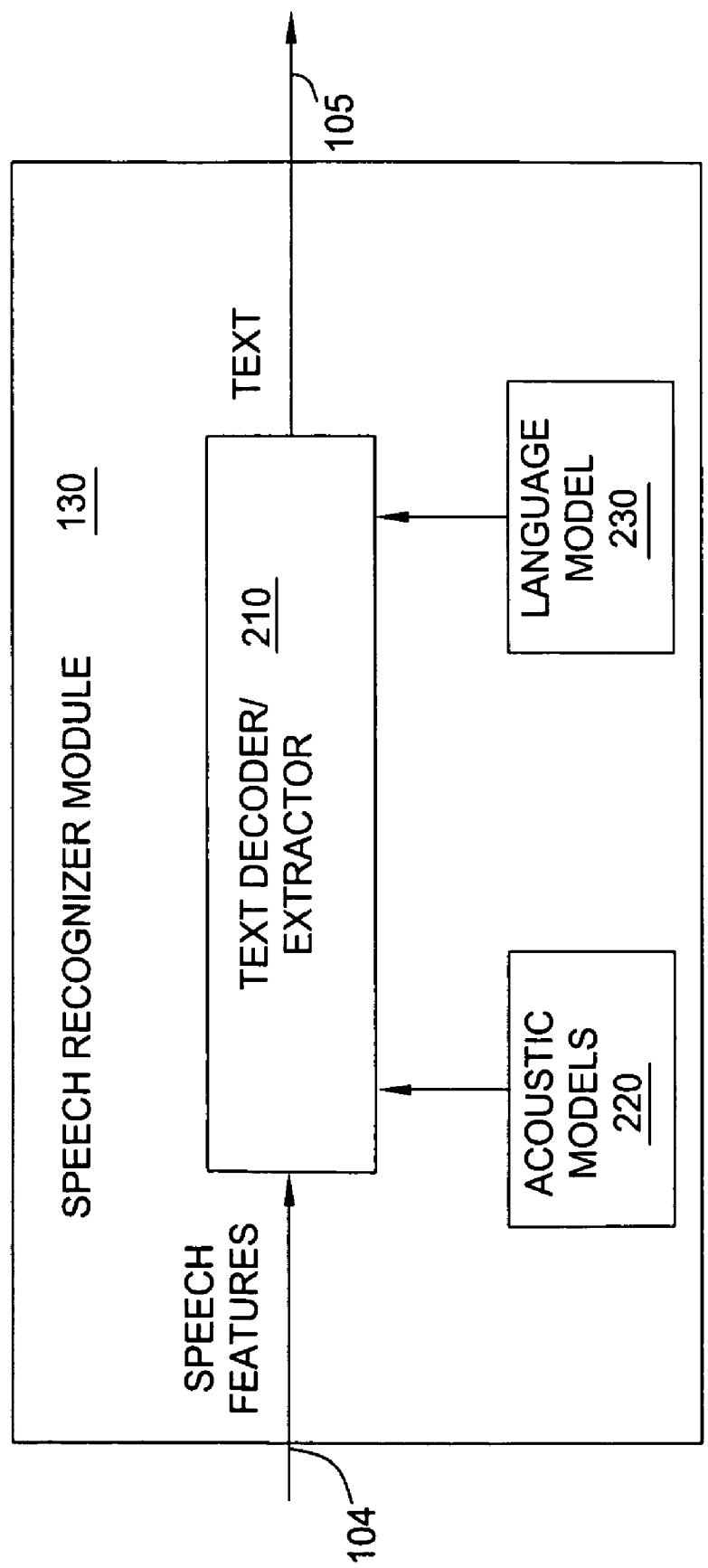
FIG. 2 illustrates a block diagram of a generic speech recognizer.

FIG. 2 illustrates a block diagram of a generic speech recognizer 130 comprising a text decoder or extractor 210, acoustics models 220 and a language model 230. Specifically, the input speech features on path 104 obtained from the utterance (input audio signal) are decoded using the acoustic models 220 and a language model 230. The acoustic models are trained using a large amount of training speech. Typically, acoustic models are Hidden Markov Models (HMMs) trained for each sound unit (phone, triphone, etc.). Each HMM usually has 3 states and each state may be modeled using one or more Gaussians. Some of the states may be tied by sharing the same Gaussians. The HMM techniques are used to identify the most likely sequence of words that could have produced the speech signal.

However, one problem with the HMM based speech recognition is the mismatch between the speech data used for training and during testing/use. Typical training data is obtained under controlled environments that are noise free. However, the test speech is obtained in real world conditions which are usually noisy. This mismatch leads to a significant loss in performance. Thus, the present approach to dynamic noise compensation (DNC) is developed to compensate for the mismatch.

Figure 3:
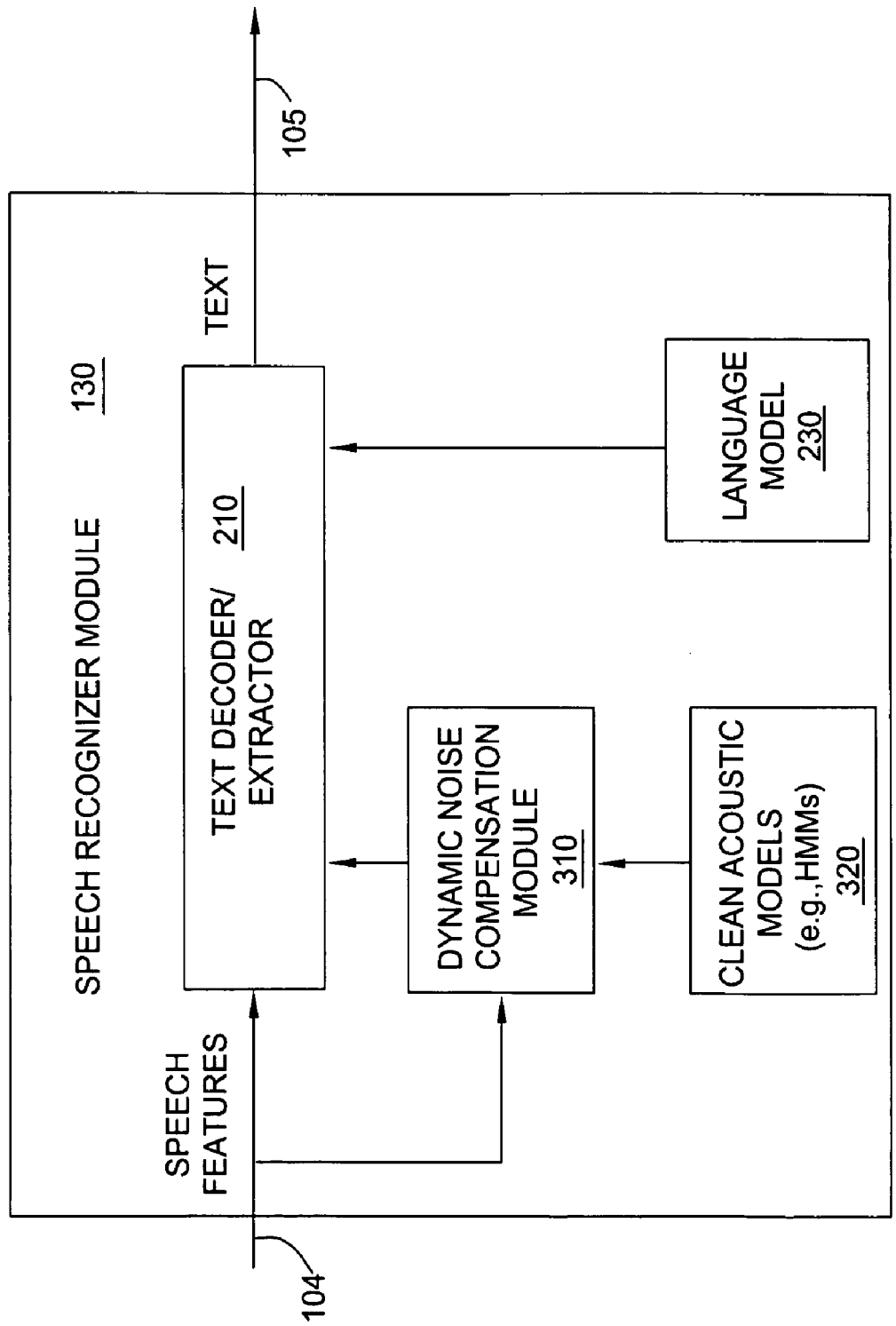
FIG. 3 illustrates a block diagram of a speech recognizer of the present invention.

FIG. 3 illustrates a block diagram of a speech recognizer 130 of the present invention comprising a text decoder or extractor 210, a dynamic noise compensator, or a dynamic noise compensation module 310, clean acoustics models 320 and a language model 230. FIG. 3 illustrates the speech recognizer using the DNC of the present invention. In one embodiment, the input noisy speech features are used to compensate the clean speech models (using the DNC formula as disclosed below) to generate models for noisy speech. These models are then used along with the language model 230 to decode the input speech features on path 104.

Figure 4:
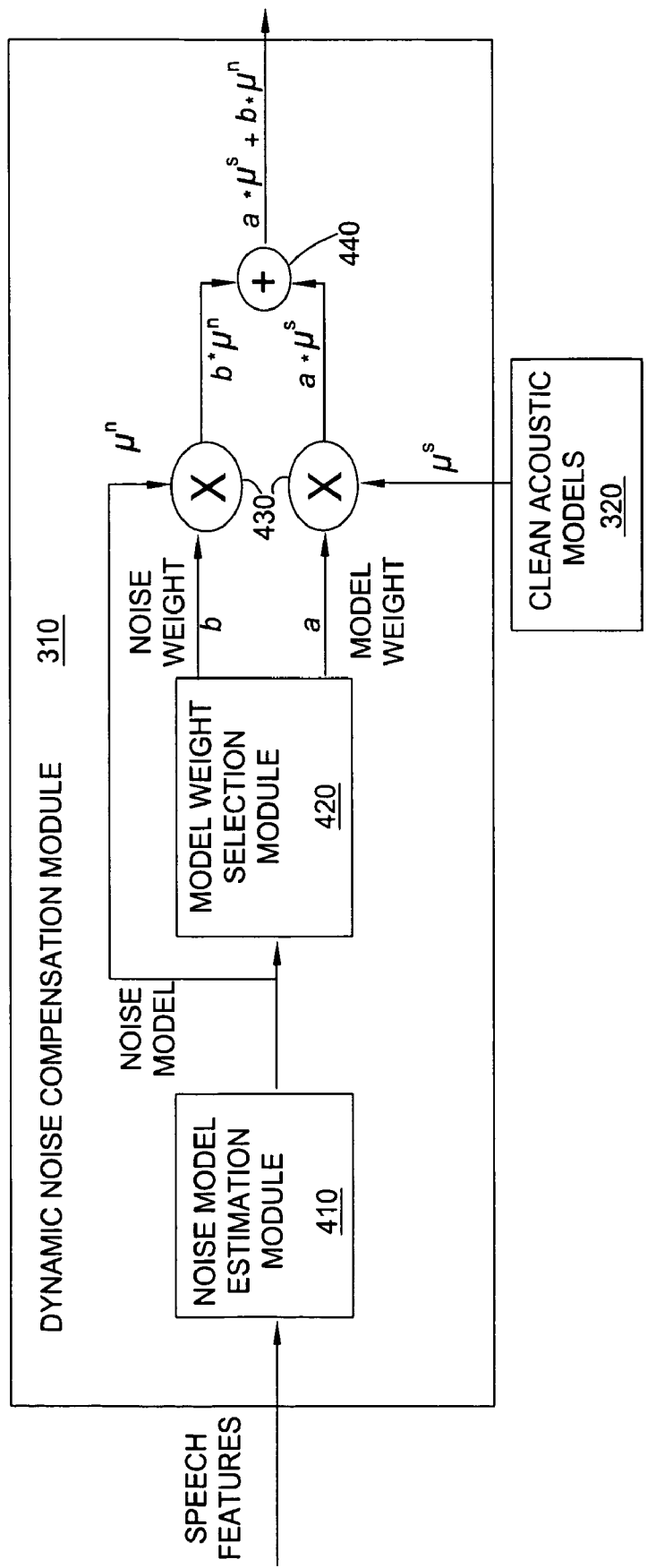
FIG. 4 illustrates a block diagram of a dynamic noise compensation module of the present invention.

FIG. 4 illustrates a block diagram of the Dynamic Noise Compensation module 310 of the present invention. It should be noted that FIG. 4 when viewed with the discussion provided below, also serves as a flowchart for the present noise compensation method.

FIG. 4 illustrates the architecture of the DNC comprising a noise estimation module 410, a model weight selection module 420, two multipliers 430 and a summer 440. The first two stages are the noise model estimation module and the model weight selection module. Specifically, the noise model is estimated using the features corresponding to the noise in the input. In one implementation, the energy is used to identify the low energy frames. The noise estimate is then used to select appropriate weight for the interpolation. This weight is then used to combine the clean speech models and the noise model to generate the models for noisy speech.

Specifically, the noise energy estimate is used to compute an estimate of the signal to noise ratio (SNR). In one implementation, the SNR is approximated by the ratio of the maximum energy to the estimated noise energy. This SNR is used to look up a table of SNR-Weight pairs and the weight corresponding to the closest SNR value in the table is used.

In one embodiment, the SNR-Weight table is generated in accordance with the following procedure. First, the clean speech is used to build the clean speech HMMs. Second, a test set of clean speech is used and corrupted using random samples of a variety of noises (for example, car noise or other noises in an environment that the speech recognition system is intended to operate within). The noise energy is then changed to produce noisy speech data at different SNRs. The present DNC algorithm is then applied with a number of weights, where the appropriate weight is then selected (i.e., the weight which produced the best recognition performance for a noisy speech having a particular SNR). This estimation is repeatedly performed at different SNRs, thereby generating the table of SNR-Weight pairs.

Namely, the Dynamic Noise Compensation is a new method that estimates the models for noisy speech using models for clean speech and a noise model. Current state-of-the-art speech recognition systems use HMMs to model speech units like triphones. A typical HMM has 3 states each modeling the initial, middle and the final segments of that triphone. Typically, these models are Gaussian Mixture Models (GMMs) which are a collection of Gaussians modeling the probability distribution of the features belonging to that state. Each Gaussian is represented by two parameters, the mean and the variance. The use of HMMs in the field of speech recognition is well known and description of HMMs can be found in general references such as L. Rabiner and B. Juang, "Fundamentals of speech recognition", Prentice Hall, 1993 and Frederick Jelinek, "Statistical Methods for Speech Recognition", MIT press, Cambridge, Mass., 1998.

In the context of the present DNC, the HMMs are trained using clean speech data. The training procedure estimates the parameters of all the Gaussians in the models. In DNC, these parameters are modified so that they now model noisy speech.

Consider a clean speech model Gaussian with a mean $\mu^{ns}$ and a standard deviation $\sigma^{ns}$. If the noise model estimated Gaussian mean is $\mu^n$, then the noise-compensated Gaussian mean $\mu^{ns}$ and standard deviation $\sigma^{ns}$ are estimated as:

$$\mu^{ns} = a*\mu^s + b*\mu^n, \quad 0 < a,b < 1 \qquad (\text{EQN. 1})$$

$$\sigma^{ns} = \sigma^s \qquad (\text{EQN. 2})$$

Where a is a first interpolation weight applied to the clean speech model and b is a second interpolation weight applied to the noise model. In one embodiment, the second interpolation weight, b, is approximately equal to 1−a. In one embodiment, at least one of the first and second interpolation weights a, b is determined from an estimate of the Signal to Noise Ratio (SNR). In one embodiment, the noise estimate (and the SNR) is obtained by averaging low energy frames in the input noisy speech. Specifically, to estimate the noise, the frames with the lowest energy in the input speech are identified. These frames are assumed to be noise frames and these are used to estimate a noise model. In one embodiment, the noise model is a Gaussian mixture model (GMM, i.e., a mixture of Gaussians); however, in an alternative embodiment, a single Gaussian model of noise also works quite well. In turn, the mean of the noise model ($\mu^n$) is used in the DNC formula to estimate the noisy speech models. This noise estimate is used to update all the Gaussians in the clean speech models (HMMs) using the above formula.

In another embodiment, the interpolation weights a and b applied to the noise model Gaussian mean $\mu^n$ and clean speech model Gaussian mean $\mu^s$ are scalar values computed in a maximum likelihood framework. Specifically, this maximum likelihood framework is used to derive closed-form expressions for the estimation of the first and second interpolation weights a and b. In addition, this maximum likelihood framework can also be used to compute an improved estimate of the noise model Gaussian mean, $\mu^n$ (e.g., derived from the initial noise model estimated Gaussian mean, which may be based on an average of the low energy frames of the noisy speech).

In one embodiment, a single Gaussian density per state and a scalar value observation are assumed such that the maximum likelihood estimates of the scalar first and second interpolation weights a and b and the noise model mean Gaussian $\mu^n$ can be derived from the general expression:

$$Q = \sum_i \sum_j \gamma_{t,j} \left[ K_j - \frac{1}{2} \frac{(y_t^{ns} - (a\mu_j^s + b\mu^n))^2}{(\sigma_j^s)^2} \right] \qquad (\text{EQN. 3})$$

where t is the time index, j is the state index, $\gamma_{t,j}$ is the posterior probability of being at state j at time t, $y_t^{ns}$ is the noisy speech observation at time t, $\mu_j^s$ and $\sigma_j^s$ are, respectively, the clean speech Gaussian mean and standard deviation from state j, and $K_j$ is an auxiliary term.

To obtain the maximum likelihood estimates for the first and second interpolation weights a and b and the noise model mean Gaussian $\mu^n$, the Q function of EQN. 3 is derived with respect to each parameter a, b, and $\mu^n$. For example, the Q function can be derived with respect to the first interpolation weight, a, as follows:

$$\frac{\partial Q}{\partial a} = 0 \Rightarrow \sum_t \sum_j \gamma_{t,j} \left[ \frac{y_t^{ns}\mu_j^s - a\mu_j^s\mu_j^s - b\mu^n\mu_j^s}{(\sigma_j^s)^2} \right] = 0 \qquad (\text{EQN. 4})$$

therefore, $$\Rightarrow \sum_t \sum_j \gamma_{t,j} \left[ \frac{y_t^{ns}\mu_j^s - b\mu^n\mu_j^s}{(\sigma_j^s)^2} \right] = \qquad (\text{EQN. 5})$$

$$a \sum_t \sum_j \gamma_{t,j} \left[ \frac{\mu_j^s\mu_j^s}{(\sigma_j^s)^2} \right]$$

Thus, the maximum likelihood estimates of the scalar value a is presented, considering a Gaussian diagonal covariance matrix, as:

$$\hat{a} = \frac{\sum_t \sum_j \gamma_{t,j} \left[ \frac{y_t^{ns}\mu_j^s - \mu^n\mu_j^s b}{(\sigma_j^s)^2} \right]}{\sum_t \Sigma \gamma_{t,j} \left[ \frac{(\mu_j^s)^2}{(\sigma_j^s)^2} \right]} \qquad (\text{EQN. 6})$$

and, taking similar steps to derive the Q function with respect to the second interpolation weight b and the noise model Gaussian mean $\mu^n$:

$$\hat{b} = \frac{\sum_t \sum_j \gamma_{t,j} \left[ \frac{y_t^{ns}\mu^n - \mu^n\mu_j^s a}{(\sigma_j^s)^2} \right]}{\sum_t \sum_j \gamma_{t,j} \left[ \frac{(\mu^n)^2}{(\sigma_j^s)^2} \right]} \qquad (\text{EQN. 7})$$

$$\hat{\mu}^n = \frac{\sum_t \sum_j \gamma_{t,j} \left[ \frac{y_t^{ns}b - \mu_j^s ab}{(\sigma_j^s)^2} \right]}{\sum_t \sum_j \gamma_{t,j} \left[ \frac{(b)^2}{(\sigma_j^s)^2} \right]} \qquad (\text{EQN. 8})$$

In one embodiment, the scalar first and second interpolation weights a and b are global; however, in another embodiment, the first and second interpolation weights a and b are dependent on phone class (e.g., where different weight sets are defined for different phone classes).

This maximum likelihood adaptation framework presents several advantages as compared to conventional acoustic adaptation methods (e.g., maximum likelihood linear regression and the like). For example, a major advantage of the present invention over traditional acoustic adaptation methods is observable when very little adaptation data is available (e.g., only one adaptation waveform). Typically, such quantities of adaptation data are insufficient for robustly estimating full-matrix transformations, such as those required for maximum likelihood linear regression. By contrast, the present invention incorporates environmental information in the adaptation transformations, and this environmental information is furthermore shared among all transformations. This enables the present scalar interpolation method, implemented in conjunction with the estimated noise mean, to tackle the lack of adaptation data more efficiently by incorporating external environmental information in the adaptation process and model interpolation.

In addition, the maximum likelihood methodology discussed above involves a much smaller number of adaptation parameters than do conventional acoustic adaptation methods. Thus, the maximum likelihood methodology discussed above is not only capable of performing fast adaptations to evolving acoustic conditions, but does so using comparatively small amounts of adaptation data. Although embodiments of the present invention use a maximum likelihood framework to estimate the interpolation parameters, in other embodiments, other frameworks (e.g., maximum entropy, minimum mutual information, etc.) could be used to estimate those interpolation parameters.

FIG. 5 illustrates a block diagram of a speech recognition system 500 of the present invention as implemented using a general purpose computer. The speech recognition device or system 500 comprises a processor (CPU) 512, a memory 514, e.g., random access memory (RAM) and/or read only memory (ROM), a speech recognizer module 516, and various input/output devices 520, (e.g., storage devices, including but not limited to, a tape drive, a floppy drive, a hard disk drive or a compact disk drive, a receiver, a transmitter, a speaker, a display, a speech signal input device, e.g., a microphone, a keyboard, a keypad, a mouse, an A/D converter, and the like).

Namely, speech recognizer module 516 can be the speech recognizer module 130 of FIG. 1. It should be understood that the speech recognizer module 516 can be implemented as a physical device that is coupled to the CPU 512 through a communication channel. Alternatively, the speech recognizer module 516 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 514 of the computer. As such, the speech recognizer module 516 (including associated methods and data structures) of the present invention can be stored on a computer readable medium, e.g., RAM memory, magnetic or optical drive or diskette and the like. Additionally, it should be understood that various modules and models (e.g., feature extraction module, language models, acoustic models, speech synthesis module, translation module and its sub-modules) as discussed above or known in the art can be stored and recalled into memory 514 for execution.

Thus, the present invention represents a significant advancement in the field of speech recognition. Because the present invention is subject to fewer adaptation parameters, it is quicker than conventional methods for environmental adaptation of speech recognition models. Moreover, the present invention makes more efficient use of processing resources than do conventional methods, by using environmental information to estimate initial noise models using in recognizing the noisy speech.

The teachings of the present invention have been shown and described in detail herein, those skilled in the art can readily devise many other varied embodiments that still incorporate these teachings.

What is claimed is:

1. A method for generating a noisy speech model for use in recognizing speech in an audio signal containing both speech and noise components, the method comprising:

applying a first interpolation weight to at least one clean speech model to produce at least one weighted clean speech model;

applying a second interpolation weight to at least one noise model to produce at least one weighted noise model;

deriving at least one noisy speech model directly from said at least one weighted clean speech model and said at least one weighted noise model, where at least one of said first interpolation weight and said second interpolation weight is computed in a maximum likelihood framework; and storing the at least one noisy speech model for use in recognizing the speech in the audio signal.

2. The method of claim 1, wherein at least one of said clean speech model and said noise model is a Gaussian model.

3. The method of claim 2, wherein said first interpolation weight and said second interpolation weight are applied to Gaussian means of, respectively, said clean speech model and said noise model.

4. The method of claim 1, wherein said noise model is a Gaussian mixture model.

5. The method of claim 1, wherein said first interpolation weight and said second interpolation weight are scalar weights.

6. The method of claim 5, wherein said scalar weights are global.

7. The method of claim 5, wherein said scalar weights are dependent on a phone class.

8. The method of claim 1, wherein said maximum likelihood framework is also used to improve an initial version of said noise model.

9. The method of claim 8, wherein said initial version of said noise model is derived directly from said audio signal.

10. A computer readable storage medium containing an executable program for generating a noisy speech model for use in recognizing speech in an audio signal containing both speech and noise components, where the program performs the steps of:

applying a first interpolation weight to at least one clean speech model to produce at least one weighted clean speech model;

applying a second interpolation weight to at least one noise model to produce at least one weighted noise model;

deriving at least one noisy speech model directly from said at least one weighted clean speech model and said at least one weighted noise model, where at least one of said first interpolation weight and said second interpolation weight is computed in a maximum likelihood framework; and storing the at least one noisy speech model for use in recognizing the speech in the audio signal.

11. The computer readable storage medium of claim 10, wherein at least one of said clean speech model and said noise model is a Gaussian model.

12. The computer readable storage medium of claim 11, wherein said first interpolation weight and said second interpolation weight are applied to Gaussian means of, respectively, said clean speech model and said noise model.

13. The computer readable storage medium of claim 10, wherein said noise model is a Gaussian mixture model.

14. The computer readable storage medium of claim 10, wherein said first interpolation weight and said second interpolation weight are scalar weights.

15. The computer readable storage medium of claim 14, wherein said scalar weights are global.

16. The computer readable storage medium of claim 14, wherein said scalar weights are dependent on a phone class.

17. The computer readable storage medium of claim 10, wherein said maximum likelihood framework is also used to improve an initial version of said noise model.

18. The computer readable storage medium of claim 17, wherein said initial version of said noise model is derived directly from said audio signal.

19. Apparatus for generating a noisy speech model for use in recognizing speech in an audio signal containing both speech and noise components, the apparatus comprising: p1 means for applying a first interpolation weight to at least one clean speech model to produce at least one weighted clean speech model;

means for applying a second interpolation weight to at least one noise model to produce at least one weighted noise model; and means for deriving at least one noisy speech model directly from said at least one weighted clean speech model and said at least one weighted noise model, where at least one of said first interpolation weight and said second interpolation weight is computed in a maximum likelihood framework.

20. The apparatus of claim 19, wherein at least one of said clean speech model and said noise model is a Gaussian model.

* * * * *